US011092135B2

(12) United States Patent
Caponetti et al.

(10) Patent No.: US 11,092,135 B2
(45) Date of Patent: Aug. 17, 2021

(54) DAMPING OF EDGEWISE WIND TURBINE BLADE VIBRATIONS

(71) Applicant: VESTAS WIND SYSTEMS A/S, Aarhus N (DK)

(72) Inventors: Fabio Caponetti, Åbyhøj (DK); Claus Thy Henningsen, Hornslet (DK); Robert Grøn-Stevens, Randers (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 219 days.

(21) Appl. No.: 16/308,676

(22) PCT Filed: Jun. 13, 2017

(86) PCT No.: PCT/DK2017/050195
§ 371 (c)(1),
(2) Date: Dec. 10, 2018

(87) PCT Pub. No.: WO2018/019345
PCT Pub. Date: Feb. 1, 2018

(65) Prior Publication Data
US 2019/0154002 A1 May 23, 2019

(30) Foreign Application Priority Data
Jun. 13, 2016 (DK) .............................. PA201670424

(51) Int. Cl.
*F03D 7/02* (2006.01)
*F03D 7/04* (2006.01)

(52) U.S. Cl.
CPC ......... *F03D 7/0296* (2013.01); *F03D 7/0224* (2013.01); *F03D 7/042* (2013.01);
(Continued)

(58) Field of Classification Search
None
See application file for complete search history.

(56) References Cited

U.S. PATENT DOCUMENTS 7,854,589 B2 * 12/2010 Nielsen ................ F03D 7/0224
416/1
8,070,437 B2 * 12/2011 Nielsen ................ F03D 7/024
416/1
(Continued)

FOREIGN PATENT DOCUMENTS

CN 1320194 C 6/2007
CN 101297112 A 10/2008
(Continued)

OTHER PUBLICATIONS

PCT Written Opinion of the International Searching Authority for application No. PCT/DK2017/050195.
(Continued)

*Primary Examiner* — Ninh H. Nguyen
*Assistant Examiner* — Jason Fountain
(74) *Attorney, Agent, or Firm* — Patterson + Sheridan, LLP (57) ABSTRACT

There is presented a method for damping an edgewise vibration of a rotor blade of a wind turbine, wherein the method comprises measuring at the rotor blade a motion parameter of the edgewise rotor blade vibration, generating based on said motion parameter a blade pitch angle control signal, and damping the edgewise vibration of the rotor blade by pitching the rotor blade according to the blade pitch angle control signal, wherein the blade pitch angle control signal is arranged so that a resulting force on a rotor blade pitched according to the blade pitch angle control signal, in a direction of the edgewise vibration of the rotor blade in a coordinate system, which rotates with a rotor of the wind turbine, is opposite and proportional to the edgewise rotor blade vibration velocity.

20 Claims, 6 Drawing Sheets

(52) U.S. Cl.
CPC ....... *F05B 2260/74* (2013.01); *F05B 2260/90* (2013.01); *F05B 2260/964* (2013.01); *F05B 2270/328* (2013.01); *F05B 2270/334* (2013.01); *Y02E 10/72* (2013.01)

(56) References Cited

U.S. PATENT DOCUMENTS

| | | | |
|---|---|---|---|
| 2009/0185901 A1* | 7/2009 | Nielsen | F03D 7/0224 416/1 |
| 2009/0246020 A1* | 10/2009 | Nielsen | F03D 7/024 416/1 |
| 2010/0301605 A1 | 12/2010 | Nielsen et al. | |
| 2012/0257967 A1 | 10/2012 | Egedal et al. | |
| 2015/0132130 A1* | 5/2015 | Brown | F03D 7/022 416/43 |

FOREIGN PATENT DOCUMENTS

| | | |
|---|---|---|
| CN | 101535634 A | 9/2009 |
| CN | 101878365 A | 11/2010 |
| CN | 102032110 A | 4/2011 |
| CN | 102606394 A | 7/2012 |
| EP | 2075462 A2 | 7/2009 |
| EP | 2463517 A1 | 6/2012 |
| WO | 9957435 A1 | 11/1999 |
| WO | 2008040347 A1 | 4/2008 |
| WO | 2008067814 A2 | 6/2008 |
| WO | 2012136663 A1 | 10/2012 |
| WO | 2013182201 A1 | 12/2013 |
| WO | 2018019345 A1 | 2/2018 |

OTHER PUBLICATIONS

Danish Patent and Trademark Office First Technical Examination for Application No. PA 2016 70424 dated Jan. 12, 2017.
PCT International Search Report for Application No. PCT/DK2017/050195 dated Aug. 9, 2017.
Chinese Office Action for Application No. 201780049468.1 dated Nov. 6, 2019.
Intellectual Property India Examination Report for Application No. 201317048584 dated May 3, 2021.

* cited by examiner

DAMPING OF EDGEWISE WIND TURBINE BLADE VIBRATIONS

FIELD OF THE INVENTION

The present invention relates to a method for damping an edgewise vibration of a rotor blade of a wind turbine, more particularly a method for damping an edgewise vibration of a rotor blade of a wind turbine by pitching of the rotor blade.

BACKGROUND OF THE INVENTION

A wind turbine as known in the art comprises a wind turbine tower and a rotor. The rotor comprises one or more rotor blades. Oscillations and vibrations of the rotor blades, for example edge-wise vibrations, are undesirable in that in worst-case they can damage the blades. Furthermore, edgewise vibrations are particularly harmful, in that they among other things can cause cracks at the root of the blade or along the trailing edge.

To eliminate harmful vibrations of the blades it is known to shut down the wind turbine for a period of time if potentially damaging edgewise vibrations of the blades are detected. But if these vibrations are detected often, this method will seriously reduce the overall output of the wind turbine. It is also known to provide the blades with different forms of mechanical dampers, most often based on the principle of a spring mounted mass combined with a damping device or they can be provided with different kinds of liquid dampers. Even though these kinds of frequency specific dampers weigh less than traditional multi-frequency dampers, they still have the disadvantage of adding considerable weight to the tip of the blade.

WO 2008/040347 A1 describes a wind turbine comprising a rotor including one or more pitchable blades, and detection means for detecting edgewise oscillations in one or more of said blades. The wind turbine is characterized in that the wind turbine comprises control means for changing the pitch angle of one or more of the blades if the detection means detects edgewise oscillations in one or more of the blades, hereby damping or eliminating the edgewise oscillations.

SUMMARY OF THE INVENTION

It may be seen as an object of the present invention to provide a method for or damping an edgewise vibration of a rotor blade of a wind turbine that solves or mitigates the above mentioned problems with reduction in overall output and/or additional weight.

The above described object is intended to be obtained in a first aspect of the invention by providing a method for damping an edgewise vibration of a rotor blade of a wind turbine, the method comprising:
  Measuring at the rotor blade, such as measuring locally at the rotor blade, a motion parameter of the edgewise rotor blade vibration, wherein said motion parameter enables determining an edgewise rotor blade vibration velocity,
  generating based on said motion parameter a blade pitch angle control signal,
  damping the edgewise vibration of the rotor blade by pitching the rotor blade according to the blade pitch angle control signal,
wherein the blade pitch angle control signal is arranged so that a resulting force on a rotor blade pitched according to the blade pitch angle control signal, in a direction of the edgewise vibration of the rotor blade in a coordinate system, which rotates with a rotor of the wind turbine, is opposite and proportional to the edgewise rotor blade vibration velocity.

The invention is particularly, but not exclusively, advantageous for obtaining a method for damping an edgewise vibration of a rotor blade of a wind turbine, which may dispense with the need for adding mechanical dampers, which may reduce the number of instances where a wind turbine has to be shut down, i.e., reduce the down time, and/or which may facilitate maintaining a high overall output. One or more of these advantages may yield greater freedom in the rotor blade design, which in turn may enable wind turbines to operate closer to the stability margin.

By 'an edgewise rotor blade vibration' is understood vibrations or oscillations along the chord between the trailing edge and the leading edge of the blade. It is furthermore understood that in general, 'an edgewise rotor blade vibration' refers to the blade first edgewise bending mode.

By 'an edgewise rotor blade vibration velocity' may be understood a linear velocity of the blade, in particular the center of mass of the blade, in a direction of the edgewise motion being along the chord between the trailing edge and the leading edge of the blade in a coordinate system, which rotates with the rotor of the wind turbine.

By 'measuring at the rotor blade' may be understood measuring the motion parameter specifically for the blade, such as obtaining raw motion parameter data relating specifically to the blade. This may be advantageous for enabling generating a blade pitch angle control signal, which is particularly well suited for damping an edgewise rotor blade vibration velocity specifically of the particular blade. More particularly, it is avoided that the raw motion parameter data is contaminated with contributions from other vibrations, in particular edgewise rotor blade vibrations from other rotor blades, which may lead to a flawed blade pitch angle control signal, which in the worst case could enhance damping with possibly detrimental consequences. By 'measuring at the rotor blade' may in particular be understood measuring locally at the blade or in the blade, such as obtaining the relevant data, such as motion parameter information, in or at the specific blade.

According to an embodiment, there is presented a method wherein
  measuring at the rotor blade a motion parameter of the edgewise rotor blade vibration,
comprises receiving motion parameter information, such as information allowing deriving the motion parameter, from a sensor placed at the rotor blade or in the rotor blade.

A possible advantage of having a sensor, such as an accelerometer, placed in the blade (such as within the blade) or at the rotor blade (such as at the blade root) may be that the data from the sensor relates particularly to the corresponding blade (which may not be the case if the sensor is placed elsewhere, e.g., in the tower or in a nacelle).

By 'blade pitch angle control signal' may be understood a pitch control signal used to control a pitch actuator, such as sent from a control system, such as a pitch control system, to a pitch force system, which adjusts a pitch of the blade.

By 'damping an edgewise vibration' may be understood exerting a damping force, such as a force, which has a direction opposite to a direction of vibrational movement of the blade during the edgewise vibration, said force having a magnitude being proportional to the speed of said movement, i.e., opposite and proportional to the edgewise rotor blade vibration velocity.

By 'damping the edgewise vibration of the rotor blade by pitching the rotor blade according to the blade pitch angle control signal' may be understood pitching the blade so that a resulting force, such as a resulting aerodynamic force due to said pitching, act to dampen the edgewise vibration.

By 'a resulting force on a rotor blade in a direction of the edgewise vibration of the rotor blade' is in general understood a force exerted on the blade, which resulting force can accelerate the center of mass of the rotor blade in a direction along the chord between the trailing edge and the leading edge of the blade. The resulting force may be understood to comprise aerodynamic forces on the blade, such as aerodynamic forces arising due to the pitching of the blade, in particular due to the pitching of the blade according to the blade pitch angle control signal. For the purpose of analyzing velocities, accelerations and forces within the context of this application, any angular velocity or angular acceleration of the rotor is neglected.

A wind turbine may comprise a plurality of rotor blades. Accordingly, there is presented a method for damping an edgewise vibration of a plurality of rotor blades of a wind turbine, the method comprising damping an edgewise vibration of a rotor blade of a wind turbine according to the first aspect individually for one or more of the blades within the plurality of rotor blades. Thus, according to this method, one or more blades within a plurality of blades may have their edgewise vibrations damped, wherein each of said one or more blades have their edgewise vibrations damped individually, such as via individual measurement of motion parameter, individual generation of blade pitch angle control signal, and individual damping of the edgewise vibration of each rotor blade by pitching each rotor blade individually according to the individual blade pitch angle control signal. In case the method relates to damping respective edgewise vibrations in a plurality of blades, then
    measuring at the rotor blade a motion parameter of the edgewise rotor blade vibration,
may comprise receiving motion parameter information from a plurality of sensors, with a sensor placed at each the rotor blade or in each individual rotor blade.

In a second aspect, the invention relates to a computer program product having instructions which, when executed cause a computing device or a control system for a wind turbine to perform a method according to the first aspect.

In a third aspect, the invention relates to a control system, such as a control system arranged for damping an edgewise rotor blade vibration of one or more rotor blades of a wind turbine, being arranged for carrying out the method according to the first aspect. The control system may be arranged to determine a pitch signal and may be implemented in a general controller for a wind turbine or a control element, such as a dedicated pitch controller.

In a fourth aspect, the invention relates to a wind turbine comprising a control system according to the third aspect.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DESCRIPTION OF EMBODIMENTS

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 1:
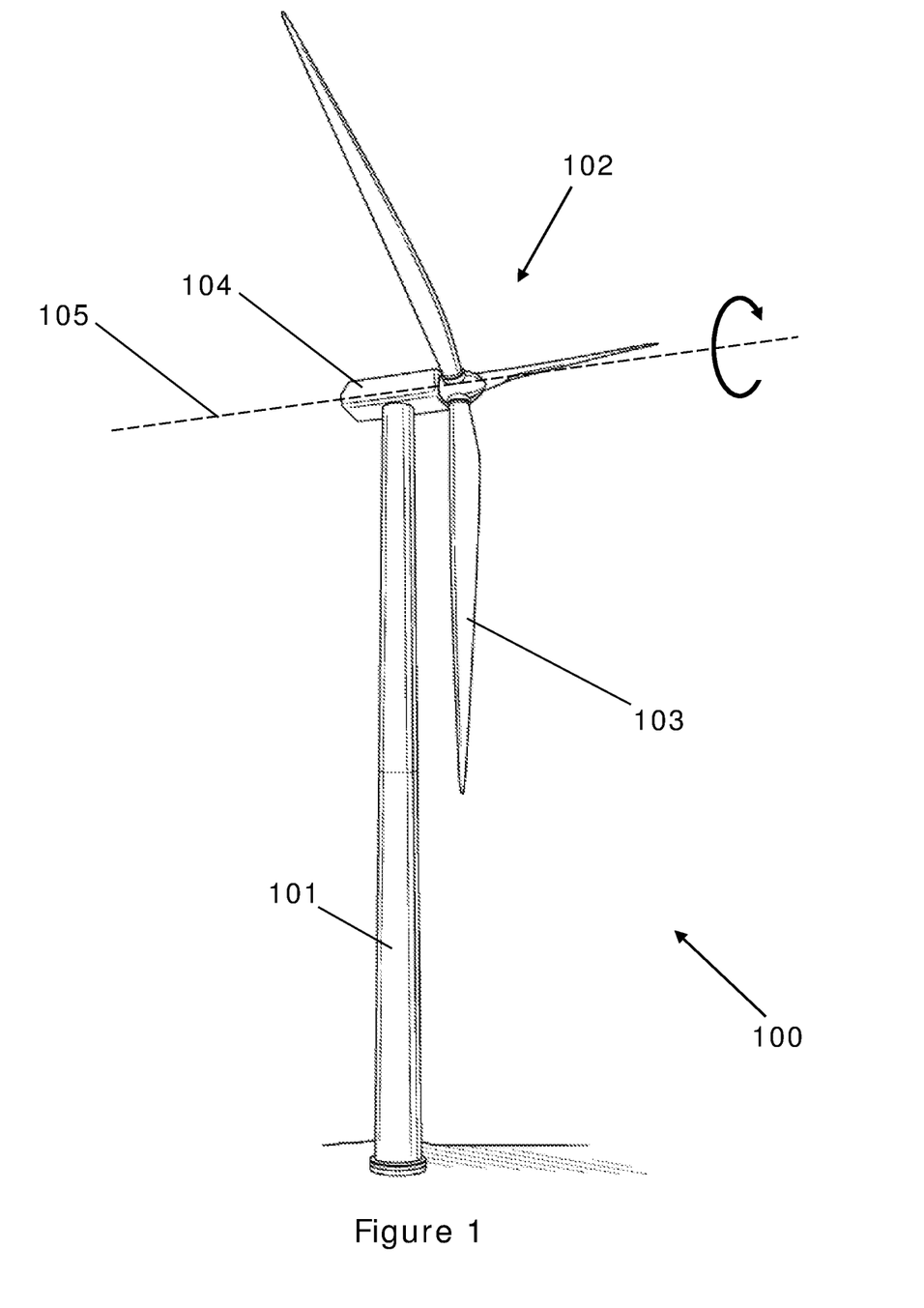
FIG. 1 shows a wind turbine 100.

FIG. 1 shows a wind turbine 100 (which may also be referred to as a wind turbine generator (WTG)) comprising a tower 101 and a rotor 102 with at least one rotor blade 103, such as three rotor blades. The rotor is connected to a nacelle 104, which is mounted on top of the tower 101 and being adapted to drive a generator situated inside the nacelle. The rotor 102 is rotatable around a rotor axis 105 by action of the wind. The wind induced rotational energy of the rotor blades 103 is transferred via a shaft to an electrical generator. Thus, the wind turbine 100 is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into a utility grid. The generator is controllable to produce a power corresponding to a power request. The rotor blades 103 can be pitched in order to alter the aerodynamic properties of the blades, e.g., in order to maximize uptake of the wind energy and to ensure that the rotor blades are not subjected to too large loads when strong winds are blowing and to damp edgewise oscillations. The wind turbine 100 comprises a control system arranged for damping an edgewise rotor blade vibration of one or more rotor blades of the wind turbine, the control system may be arranged to determine a pitch signal and may be implemented in a general controller for a wind turbine or a control element, such as a dedicated pitch controller, e.g., where the blades are pitched individually by a pitch system with a pitch force system controlled by a pitch control system, where the pitch force system includes actuators, such as hydraulic actuators, for individually pitching the blades dependent on a pitch signal from the pitch control system, such as the pitch signal comprising one or more individual blade pitch angle control signals corresponding to one or more respective blades.

Figure 2:
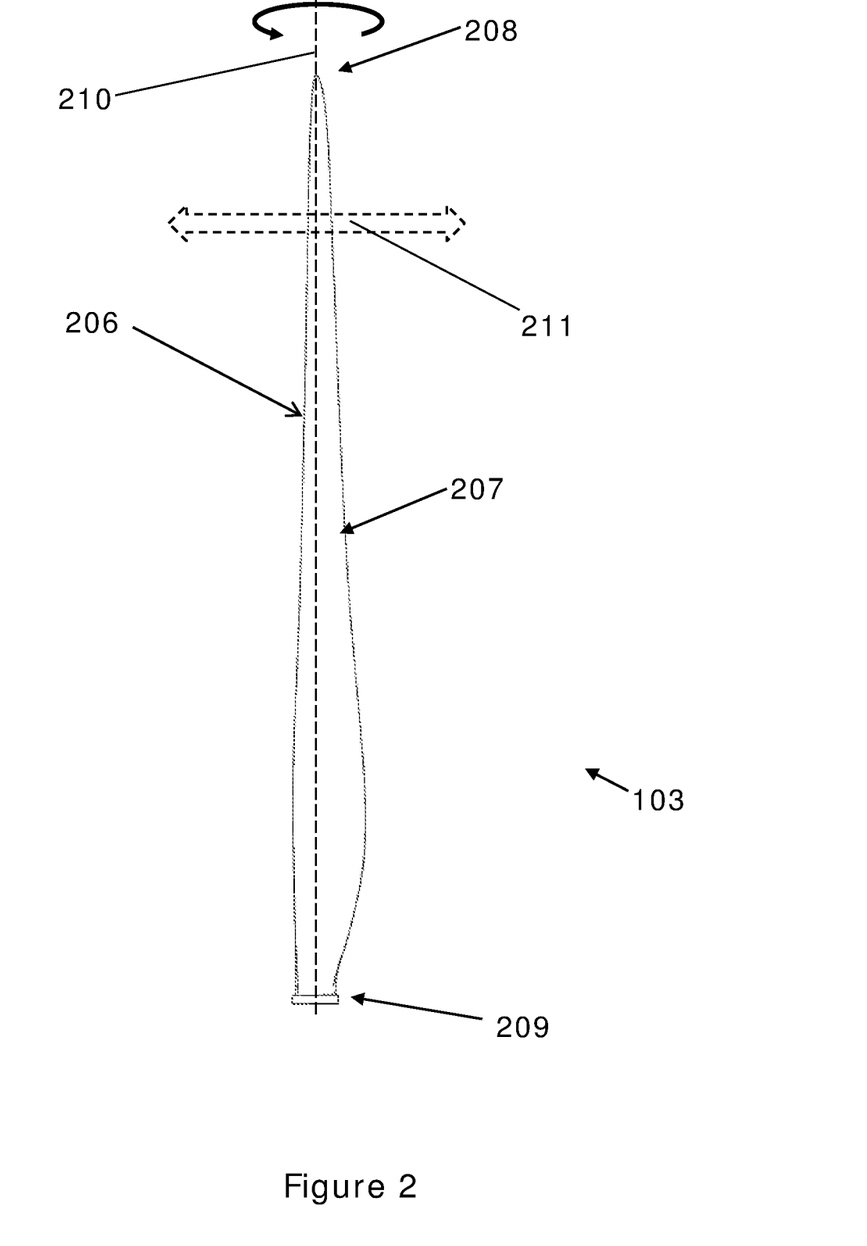
FIG. 2 shows a wind turbine blade as seen from the front/pressure side.

FIG. 2 shows a wind turbine blade 103, as seen from the front/pressure side. Wind turbine blade and rotor blade, such rotor blade of a wind turbine, may be referred to interchangeably. The wind turbine blade 103 comprises a leading edge 206, a trailing edge 207, a tip 208 and a root 209. A wind turbine blade 103 known in the art is typically made of a glass fibre and resin composite reinforced by carbon fibre, carbon fibre reinforced wood or a combination hereof. A wind turbine blade 103 known in the art, has an elastic centre which is closer to the leading edge 206 than to the trailing edge 207, at least regarding most parts of the blade 103. If edgewise oscillations occur at a frequency at or close to the blades first natural edgewise frequency, especially the trailing edge 207 is therefore exposed to considerable strain, which under certain conditions can damaged the blade 103 and result in cracks along the trailing edge 207. During pitching, the blade rotates around a pitch axis 210, which may typically substantially correspond to the length axis of the blade. The arrow 211 indicates the direction of 'an edgewise rotor blade vibration' along or parallel with the chord between the trailing edge and the leading edge of the blade.

The edgewise vibrations may be damped by exerting a resulting force, such as an aerodynamic force, in a direction of the edgewise vibration of the rotor blade in a coordinate system, which rotates with a rotor of the wind turbine, which force is opposite and proportional to the edgewise rotor blade vibration velocity.

Figure 3:
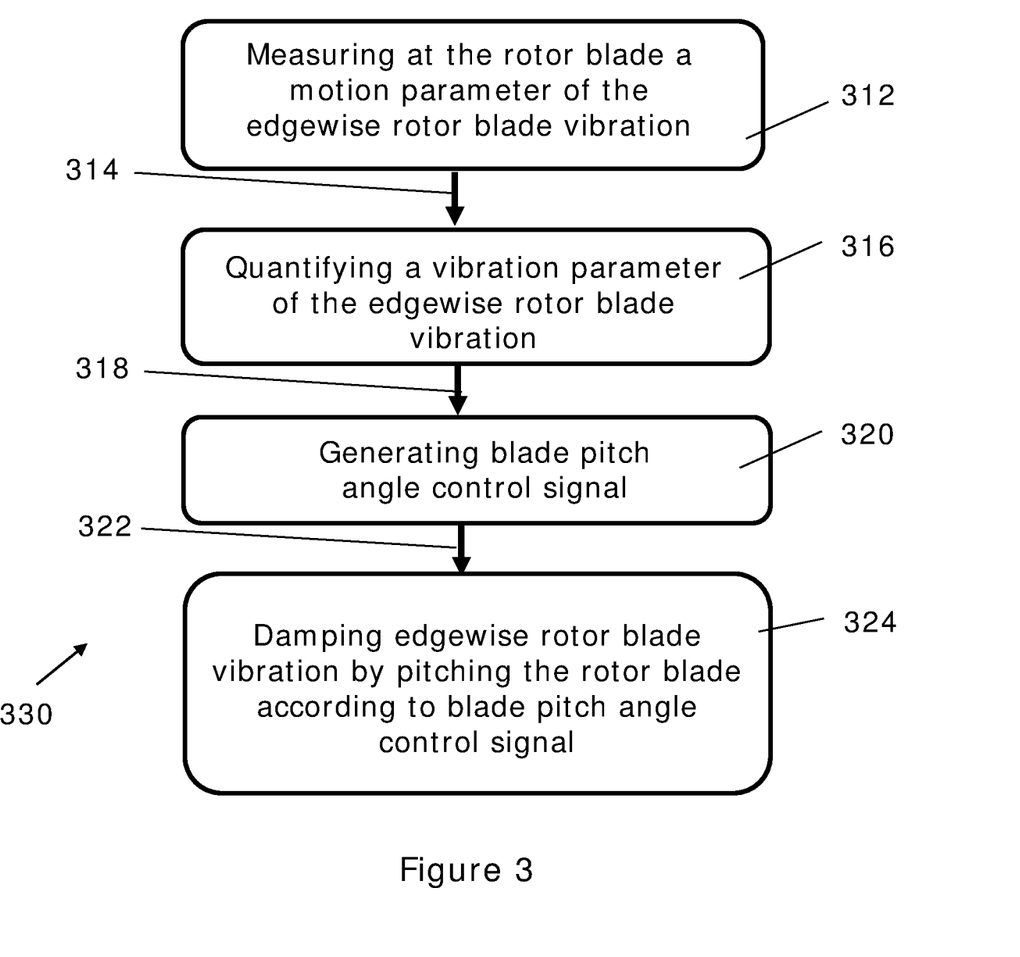
FIG. 3 shows a method for damping an edgewise vibration of a rotor blade of a wind turbine according to an embodiment.

The method may be seen as emulating a viscous damper by creating a force which opposes the edgewise vibration motion of the blade. The blade behavior can be modelled as a simple linear spring-mass-damper system. The edgewise vibrations can be modelled as a simple linear spring-mass-damper system. The blade displacement x along the edgewise direction as a function of the time t is accordingly governed by the differential equation:

$$m\ddot{x}(t)+c\dot{x}(t)+kx(t)=F(t)$$

Where m is the mass, c the damping coefficient and k is spring constant. Damping may be realized by generating a force F(t) proportional to the vibration velocity $\dot{x}(t)$. This may for example be achieved for a blade or independently for each blade in a plurality of blades by:
a) Measuring the blade edgewise vibration acceleration, $\ddot{x}(t)$
b) Compensating the reading for the self-weight induced moment
c) Estimating the edgewise blade velocity via a leaky integrator, $\ddot{x}(t) \rightarrow \widetilde{\dot{x}(t)}$
d) Generating via individually pitching said blade a resulting force proportional to the estimated velocity, $F(t)=-K_P \widetilde{\dot{x}(t)}$ FIG. 3 shows a method 330 for damping an edgewise vibration of a rotor blade of a wind turbine according to an embodiment, comprising:
Measuring 312 at the rotor blade a motion parameter 314, such as corresponding values of acceleration of the blade and time, of the edgewise rotor blade vibration, wherein said motion parameter enables determining an edgewise rotor blade vibration velocity,
Quantifying 316 a vibration parameter, such as an RMS level of strain at a position in the blade, of the edgewise rotor blade vibration, and optionally generating a trigger signal 318 initiating damping in case of the vibration parameter exceeding a predetermined entry threshold,
(in case of the vibration parameter exceeding a predetermined entry threshold) generating 320 based on said motion parameter 314 a blade pitch angle control signal 322, and sending the blade pitch angle control signal to a pitch system,
damping 324 the edgewise vibration of the rotor blade by pitching the rotor blade according to the blade pitch angle control signal 322,
wherein the blade pitch angle control signal 322 is arranged so that a resulting force on a rotor blade pitched according to the blade pitch angle control signal, in a direction of the edgewise vibration of the rotor blade in a coordinate system, which rotates with a rotor of the wind turbine, is opposite and proportional to the edgewise rotor blade vibration velocity.

According to an embodiment, there is presented a method wherein
damping the edgewise vibration of the rotor blade by pitching the rotor blade according to the blade pitch angle control signal,
is carried out for a limited period of time, such as carried out for only 60 seconds, such as only 30 seconds, such as only 10 seconds, such as only 5 seconds, such as only 1 second. A possible advantage of carrying out the method for such limited amount of time is that it enables saving blade bearing lifetime and/or limit the hydraulic oil consumption (in case of hydraulic pitching system).

According to an embodiment, the method is comprising:
Quantifying a vibration parameter of the edgewise rotor blade vibration,
damping the edgewise vibration of the rotor blade of the wind turbine if the vibration parameter exceeds a predetermined entry threshold.

An advantage of this embodiment may be that it ensures that damping is carried out when—and only—when it is required, such as ensuring that vibrations can be kept at an acceptable level (below the entry threshold), while not reducing blade bearing lifetime and/or consuming hydraulic oil (in case of hydraulic pitching system) unnecessarily, e.g., when the vibration level is acceptable. The vibration parameter may be an RMS level, such as an RMS level of strain within the blade, such as at a certain position within the blade. The predetermined entry threshold may be a threshold corresponding to a value of the vibration parameter beyond which fatigue may be relevant and/or beyond which vibrations—if not damped—might be dangerous for the blade structural integrity.

According to a further embodiment the method is comprising:
Quantifying the vibration parameter of the edgewise rotor blade vibration if the vibration parameter exceeds the predetermined entry threshold,
stop damping the edgewise vibration of the rotor blade of the wind turbine if the vibration parameter goes below a predetermined exit threshold.

It may be understood that if the vibration parameter exceeds the predetermined entry threshold and damping is initiated, then the vibration parameter may subsequently be quantified, such as quantified repeatedly, and damping stopped if the vibration parameter goes below a predetermined exit threshold. The predetermined exit threshold may be identical to or different with respect to, such as lower than, the predetermined entry threshold.

According to another further embodiment, there is presented a method wherein the wind turbine is stopped:
if the vibration parameter exceeds the predetermined entry threshold and a predetermined threshold amount of time then passes after which the vibration parameter is above a predetermined stoppage threshold,
and/or
if the vibration parameter exceeds the predetermined entry threshold and a predetermined rate amount of time then passes where after the vibration parameter is increasing.

An advantage of this embodiment may be that it safeguards the wind turbine, such as the structural integrity of the wind turbine, by stopping it in case the vibration parameter is too high (above a predetermined stoppage threshold) even after damping has been attempted (i.e., after a predetermined threshold amount of time has passed since initiating damping due to the predetermined entry threshold being exceeded) and/or if the vibration parameter is still increasing even after damping has been attempted (i.e., after a predetermined rate amount of time has passed since initiating damping due to the predetermined entry threshold being exceeded).

According to an embodiment, there is presented a method, wherein the wind turbine is stopped if the vibration parameter exceeds a predetermined shutdown threshold. An advantage of this embodiment may be that it safeguards the structural integrity of the wind turbine by stopping it in case the vibration parameter is too high, such as so high that fatigue becomes an issue and or that the structural integrity of the wind turbine is at risk.

According to an embodiment the blade pitch angle control signal is arranged so that the rotor blade pitched according to the blade pitch angle control signal has the pitch angle offset with an amount, such as an angular amount which may be referred to as offset, proportional to the edgewise rotor blade vibration velocity. The method according to this embodiment is applied for pitch angles which are sufficiently small, that the corresponding resulting forces, such as the corresponding aerodynamic forces are substantially proportional with pitching angle.

According to a further embodiment, there is presented a method, wherein said offset, such as this offset corresponding to the angular amount the pitch angle is offset, is generated in addition to a normal pitch angle algorithm controlling the pitch angle of said blades in relation to normal wind turbine control parameters. It may in general be understood, that when referring to 'pitch angle' for damping, then the pitch angle (in the blade pitch angle control signal) is a pitch angle offset which is applied in addition to a pitch angle change being preformed to optimise the blades angle to the incoming wind during normal operation, such as in relation to power output, load and noise. Reference to 'normal' in this context is understood as referring to algorithm, control parameters relating to operation of a wind turbine without the method for damping edgewise vibrations according to the present application.

According to a further embodiment, said motion parameter corresponds to any one of:
A plurality of corresponding values of time and position of the rotor blade, such as the centre of mass of the rotor blade,
a rotor blade velocity,
a plurality of corresponding values of time and acceleration of the rotor blade, such as the centre of mass of the rotor blade,
a plurality of corresponding values of time and force,
a plurality of corresponding values of time and moment,
a plurality of corresponding values of time and strain,
a plurality of corresponding values of time and stress.

According to a further embodiment there is presented a method, wherein
measuring at the rotor blade a motion parameter of the edgewise rotor blade vibration,
comprises any one of:
receiving temporally resolved position information from a position sensor, such as a strain sensor optionally placed in the blade root (e.g., piezo-based or optically based, such based on a Bragg grating) or a GPS (global positioning system) based sensor, wherein said position information enables determining a plurality of corresponding values of time and position of the rotor blade, such as the centre of mass of the rotor blade,
receiving velocity information from a velocity sensor, such as a flow-based sensor, such as the velocity information relating to the centre of mass of the rotor blade,
receiving temporally resolved acceleration information from an acceleration sensor, such as an accelerometer, wherein said acceleration information enables determining a plurality of corresponding values of time and acceleration of the rotor blade, such as the centre of mass of the rotor blade,
receiving gyroscopic information from a gyro sensor, such as a gyroscope optionally based on MEMS (micro-electro mechanical systems) or optics.

According to a further embodiment, the sensor is placed in the rotor blade. In case of damping of edgewise vibrations of a plurality of blades, there is a sensor placed in each of the plurality of blades.

Figure 4:
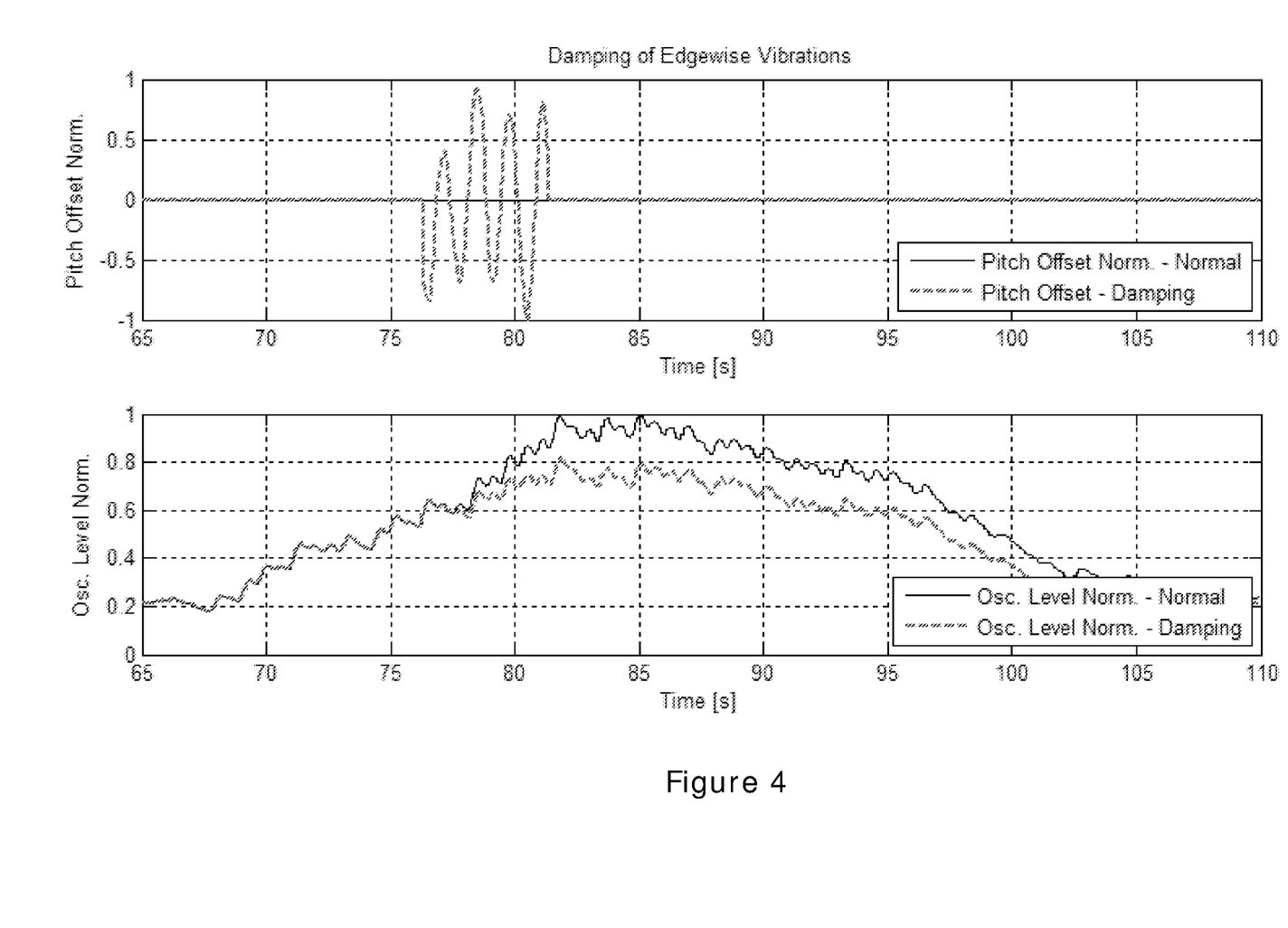
FIGS. 4-5 shows results from a simulation of a damping of an edgewise vibration of a rotor blade.
Figure 5:
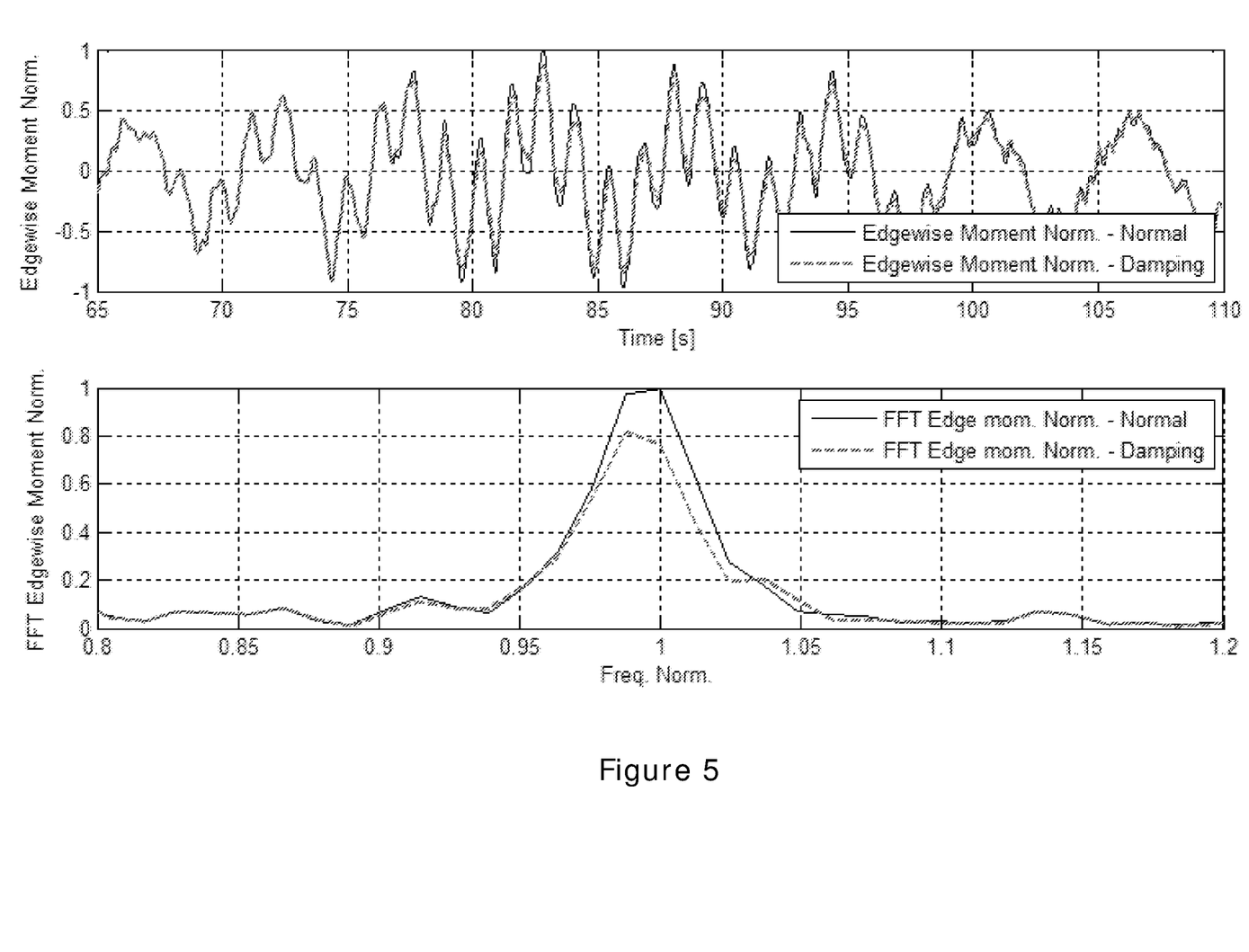

FIGS. 4-5 shows results from a simulation of a damping of an edgewise vibration of a rotor blade.

More particularly, the upper graph FIG. 4 shows a normalized pitch offset, i.e., a pitch offset applied at a blade for damping an edgewise vibration. The pitching is applied for a limited time only, more particularly approximately 5 seconds from a starting time at approximately t=76 seconds to a stopping time approximately at t=81 seconds.

The lower graph in FIG. 4 shows a normalized oscillation level during normal (not damped) operation and during operation wherein the blade is damped via the pitching signal according to the upper graph in FIG. 4. The figure shows, that the maximum level of oscillation is reduced due to the damping.

The upper graph in FIG. 5 shows a normalized moment during normal (not damped) operation and during operation wherein the blade is damped via the pitching signal according to the upper graph in FIG. 4.

The lower graph in FIG. 5 shows fast Fourier transforms (FFT) of the moment curves of the upper graph of FIG. 5. The figure shows, that the moment fluctuations are reduced due to the damping.

Figure 6:
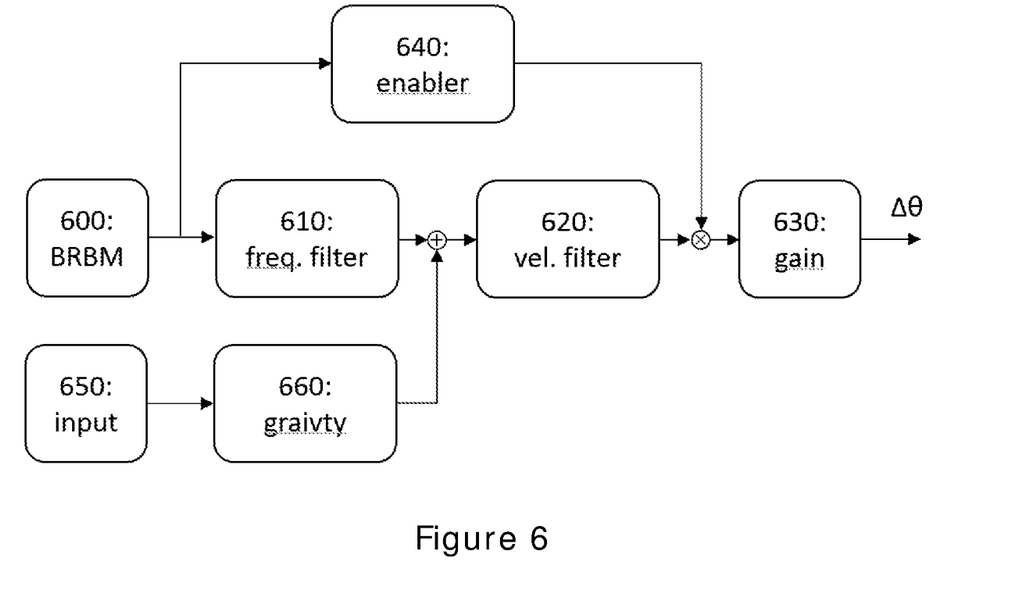
FIG. 6 illustrates an example flow diagram showing the determination of a pitch offset that creates a force opposite to the edgewise motion.

FIG. 6 illustrates an example flow diagram showing the determination of a pitch offset, $\Delta\theta$, that creates a force opposite to the edgewise motion, e.g. an offset as illustrated in FIG. 4.

The figure illustrates determining a rotor blade motion parameter in the form of an edgewise blade root bending moment (BRBM) 600. This may e.g. be measured by a root bending moment sensor in the form of a root strain sensor positioned to measure the strain in the edgewise direction and output the edgewise blade root bending moment.

The edgewise blade root bending moment is input into a frequency filter 610 which filters the signal to isolate the signal around the first edgewise vibration frequency. This may be obtained by a frequency pass filter centred at the first edgewise vibration center frequency. The width of the filter may be selected in accordance with the frequency spectrum of the blade, and is typically between 0.5 Hz and 5 Hz. A example width may be 1 Hz.

The frequency filtered signal is then input into a velocity estimation filter 620. This filter may be any filter which based on the blade root bending moment can estimate the blade velocity. In an embodiment, the velocity estimation filter integrates the blade root bending moment to determine an estimate for for the velocity, for example by use of a leaky integration filter. The velocity estimate is multiplied with a gain 630 in order to determine a pitch offset to be added to the pitch actuator of the blade.

Additionally an enabler 640 may be present which based on a quantification of the vibrational parameter may determine a vibration level and output an enable signal, such as a number between 0 and 1 which is multiplied with the velocity signal.

Further, a feedforward term 660 taking into account the bending moment from the 1P gravity loading may be taken into account. This may be based on an input 650 of rotor azimuth angle and pitch angle in order to correctly apply the rotating gravity induced moment.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method, comprising:
   measuring a motion parameter of a rotor blade of a wind turbine, wherein the motion parameter of the rotor blade is a blade root bending moment;
   determining, based on the motion parameter, an edgewise rotor blade vibration velocity of an edgewise vibration of the rotor blade, wherein determining the edgewise rotor blade vibration velocity comprises:
      estimating the edgewise rotor blade vibration velocity using the blade root bending moment;
   generating, based on the edgewise rotor blade vibration velocity, a blade pitch angle control signal; and
   damping the edgewise vibration of the rotor blade by pitching the rotor blade according to the blade pitch angle control signal,
   wherein a resulting force on the rotor blade pitched according to the blade pitch angle control signal is, in a direction of the edgewise vibration of the rotor blade in a coordinate system that rotates with a rotor of the wind turbine, opposite and proportional to the edgewise rotor blade vibration velocity.

2. The method according to claim 1, wherein the rotor blade is one of a plurality of rotor blades of the wind turbine, and wherein the damping is performed for each individual rotor blade of the plurality of rotor blades.

3. The method according to claim 1, wherein measuring the motion parameter comprises receiving motion parameter information from a sensor placed at the rotor blade or in the rotor blade.

4. The method according to claim 1, wherein pitching the rotor blade according to the blade pitch angle control signal is carried out for a limited period of time.

5. The method according to claim 1, wherein pitching the rotor blade according to the blade pitch angle control signal causes a pitch angle of the rotor blade to be offset with an amount proportional to the edgewise rotor blade vibration velocity.

6. The method according to claim 5, wherein the offset is generated in addition to generating the pitch angle according to an algorithm controlling the pitch angle of the rotor blade according to wind turbine control parameters.

7. The method according to claim 1, wherein measuring the motion parameter comprises acquiring a plurality of corresponding values that corresponds to any one of:
   a plurality of corresponding values of time and position of the rotor blade;
   a velocity of the rotor blade;
   a plurality of corresponding values of time and acceleration of the rotor blade;
   a plurality of corresponding values of time and force;
   a plurality of corresponding values of time and moment;
   a plurality of corresponding values of time and strain; and
   a plurality of corresponding values of time and stress.

8. The method according to claim 1, wherein measuring a motion parameter of the rotor blade comprises any one of:
   receiving temporally resolved position information from a position sensor, wherein the temporally resolved position information enables determining a plurality of corresponding values of time and position of the rotor blade;
   receiving velocity information from a velocity sensor;
   receiving temporally resolved acceleration information from an acceleration sensor, wherein the temporally resolved acceleration information enables determining a plurality of corresponding values of time and acceleration of the rotor blade; and
   receiving gyroscopic information from a gyro sensor.

9. The method of claim 1,
   wherein estimating the edgewise rotor blade vibration velocity comprises applying a leaky integration filter to the blade root bending moment; and
   wherein generating the blade pitch angle control signal comprises multiplying the edgewise rotor blade vibration velocity by a gain factor to determine a blade pitch offset.

10. A method comprising:
    determining whether a vibration parameter of an edgewise vibration of a rotor blade of a wind turbine exceeds a predetermined entry threshold;
    measuring a motion parameter of the rotor blade, wherein measuring the motion parameter comprising acquiring a plurality of corresponding values for a center of mass of the rotor blade, wherein the motion parameter enables determining an edgewise rotor blade vibration velocity of the edgewise vibration;
    generating, based on the motion parameter, a blade pitch angle control signal; and
    damping, when the vibration parameter exceeds the predetermined entry threshold, the edgewise vibration of the rotor blade by pitching the rotor blade according to the blade pitch angle control signal,
    wherein a resulting force on the rotor blade pitched according to the blade pitch angle control signal is, in a direction of the edgewise vibration of the rotor blade in a coordinate system that rotates with a rotor of the wind turbine, opposite and proportional to the edgewise rotor blade vibration velocity.

11. The method according to claim 10, further comprising:
    determining the vibration parameter of the edgewise rotor blade vibration when the vibration parameter exceeds the predetermined entry threshold; and stopping damping the edgewise vibration of the rotor blade when the vibration parameter decreases to less than a predetermined exit threshold.

12. The method according to claim 10, further comprising:
stopping the wind turbine responsive to one of:
the vibration parameter exceeding the predetermined entry threshold and a predetermined threshold amount of time then passes after which the vibration parameter exceeds a predetermined stoppage threshold, and
the vibration parameter exceeding the predetermined entry threshold and a predetermined amount of time then passes after which the vibration parameter is increasing.

13. The method according to claim 10, further comprising:
stopping the wind turbine when the vibration parameter exceeds a predetermined shutdown threshold.

14. The method of claim 10, wherein the plurality of corresponding values correspond to any one of:
a plurality of corresponding values of time and position of the rotor blade;
a velocity of the rotor blade;
a plurality of corresponding values of time and acceleration of the rotor blade;
a plurality of corresponding values of time and force;
a plurality of corresponding values of time and moment;
a plurality of corresponding values of time and strain; and
a plurality of corresponding values of time and stress.

15. A wind turbine, comprising:
a tower;
a nacelle disposed on the tower;
a rotor extending from the nacelle and having a plurality of rotor blades disposed thereon; and
a controller configured to perform an operation of damping an edgewise vibration of at least one rotor blade of the plurality of rotor blades, the operation comprising:
measuring a motion parameter of the edgewise rotor blade vibration, wherein the motion parameter of the rotor blade is a blade root bending moment;
determining, based on the motion parameter, an edgewise rotor blade vibration velocity, wherein determining the edgewise rotor blade vibration velocity comprises:
estimating the edgewise rotor blade vibration velocity using the blade root bending moment;
generating, based on the edgewise rotor blade vibration velocity, a blade pitch angle control signal; and
damping the edgewise vibration of the at least one rotor blade by pitching the rotor blade according to the blade pitch angle control signal,
wherein a resulting force on the rotor blade pitched according to the blade pitch angle control signal is, in a direction of the edgewise vibration of the at least one rotor blade in a coordinate system that rotates with a rotor of the wind turbine, opposite and proportional to the edgewise rotor blade vibration velocity.

16. The wind turbine of claim 15, wherein damping the edgewise vibration of the at least one rotor blade is performed for each of the plurality of rotor blades individually.

17. The wind turbine of claim 15, wherein measuring the motion parameter comprises receiving motion parameter information from a sensor placed at the rotor blade or in the rotor blade.

18. The wind turbine of claim 15, further comprising:
determining whether a vibration parameter of the edgewise vibration exceeds a predetermined entry threshold; and
stopping the wind turbine responsive to one of:
the vibration parameter exceeding the predetermined entry threshold and a predetermined threshold amount of time then passes after which the vibration parameter exceeds a predetermined stoppage threshold, and
the vibration parameter exceeding the predetermined entry threshold and a predetermined amount of time then passes after which the vibration parameter is increasing.

19. The wind turbine of claim 15, wherein pitching the rotor blade according to the blade pitch angle control signal causes a pitch angle of the rotor blade to be offset with an amount proportional to the edgewise rotor blade vibration velocity.

20. The wind turbine of claim 19, wherein the offset is generated in addition to generating the pitch angle according to an algorithm controlling the pitch angle of the rotor blade according to wind turbine control parameters.

* * * * *